United States Patent
Russo, Jr. et al.

(10) Patent No.: US 10,484,431 B2
(45) Date of Patent: *Nov. 19, 2019

(54) DYNAMIC APPLICATION VERSIONING SYSTEM

(71) Applicant: ADP, LLC, Roseland, NJ (US)

(72) Inventors: Alvaro Russo, Jr., Warren, NJ (US); Dmitri Snytkine, Delaware Water Gap, PA (US); Hanwoong Darren Cho, Summit, NJ (US); Donna M. Altamura, Budd Lake, NJ (US); Tushar S. Sheth, Union City, CA (US); Michael Justin Brauman, Westfield, NJ (US); Steven J. Roth, Wayne, NJ (US); Vincent Civetta, Randolph, NJ (US); Steven F. Bergamini, Oakland, NJ (US)

(73) Assignee: ADP, LLC, Roseland, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,729

(22) Filed: Nov. 16, 2018

(65) Prior Publication Data

US 2019/0089745 A1 Mar. 21, 2019

Related U.S. Application Data

(63) Continuation of application No. 15/009,423, filed on Jan. 28, 2016, now Pat. No. 10,158,669.

(51) Int. Cl.
*H04L 29/06* (2006.01)
*H04L 29/08* (2006.01)
(Continued)

(52) U.S. Cl.
CPC .......... *H04L 63/20* (2013.01); *H04L 63/0876* (2013.01); *H04L 67/04* (2013.01);
(Continued)

(58) Field of Classification Search
CPC ....... H04L 63/20; H04L 67/04; H04L 67/125; H04L 67/306; H04L 67/32;
(Continued)

(56) References Cited

U.S. PATENT DOCUMENTS 6,425,125 B1 * 7/2002 Fries .................. G06F 8/658
717/168
7,167,705 B2 * 1/2007 Maes ................ H04W 36/0011
455/411

(Continued)

OTHER PUBLICATIONS

Office Action, dated Jul. 24, 2017, regarding U.S. Appl. No. 15/009,423, 36 pages.

(Continued)

*Primary Examiner* — Taghi T Arani
*Assistant Examiner* — Badri Narayanan Champakesan
(74) *Attorney, Agent, or Firm* — Yee & Associates, P.C.

(57) ABSTRACT

A computer system authenticates a user of a mobile application. In response to authenticating the user, the computer identifies a user profile for the user. The user profile includes a current application state for the mobile application. The computer then selects an application version based on applying a set of rules to the current application state. The computer then sends a response to the mobile device indicating the selected application version, enabling performing an operation for the organization based on the selected version for the application selectively enabling access to services provided by the organization for people.

21 Claims, 8 Drawing Sheets

(51) Int. Cl.
*H04W 12/06* (2009.01)
*H04W 12/08* (2009.01)

(52) U.S. Cl.
CPC ........ *H04L 67/1097* (2013.01); *H04L 67/125* (2013.01); *H04L 67/306* (2013.01); *H04L 67/32* (2013.01); *H04W 12/06* (2013.01); *H04W 12/08* (2013.01)

(58) Field of Classification Search
CPC ........... H04L 67/1097; H04L 63/0876; H04W 12/08; H04W 12/06
See application file for complete search history.

(56) References Cited

U.S. PATENT DOCUMENTS

| | | | | |
|---|---|---|---|---|
| 7,991,427 B2* | 8/2011 | Nath | ...................... | H04L 41/046 455/552.1 |
| 8,121,585 B2* | 2/2012 | Commarford | ...... | H04L 67/1095 455/418 |
| 8,359,016 B2* | 1/2013 | Lindeman | ............... | H04L 67/34 455/414.1 |
| 8,463,884 B2* | 6/2013 | Clinton | ................. | H04W 8/245 709/221 |
| 8,495,700 B2* | 7/2013 | Shahbazi | .......... | H04W 12/0027 726/1 |
| 8,862,105 B2* | 10/2014 | Lindeman | ............... | H04L 67/34 455/414.1 |
| 8,910,263 B1* | 12/2014 | Martini | ................ | H04L 63/102 726/8 |
| 9,110,564 B2* | 8/2015 | Hwang | ............... | G06F 3/04817 |
| 10,282,186 B2* | 5/2019 | Judge | ........................ | G06F 8/65 |
| 2003/0092438 A1* | 5/2003 | Moore | ................ | H04W 84/025 455/423 |
| 2004/0192282 A1* | 9/2004 | Vasudevan | ............ | H04L 67/303 455/419 |
| 2005/0097544 A1* | 5/2005 | Kim | ........................ | G06F 8/65 717/173 |
| 2009/0221307 A1* | 9/2009 | Wolak | ................... | G06Q 10/10 455/466 |
| 2010/0262959 A1* | 10/2010 | Bruno | ................. | G06F 21/6209 717/171 |
| 2013/0183937 A1* | 7/2013 | Neal | ..................... | H04W 12/12 455/411 |
| 2013/0210404 A1* | 8/2013 | Curtis | .................... | H04L 67/34 455/418 |
| 2013/0347130 A1* | 12/2013 | Sima | .................... | G06F 21/6209 726/29 |
| 2014/0173590 A1* | 6/2014 | Ein-Gal | ............... | G06F 9/45558 717/178 |
| 2014/0236846 A1* | 8/2014 | Melika | .................. | G06Q 50/184 705/310 |
| 2014/0298420 A1* | 10/2014 | Barton | ..................... | H04L 63/10 726/4 |
| 2014/0331273 A1* | 11/2014 | Koneru | ................... | H04L 63/20 726/1 |
| 2015/0067030 A1* | 3/2015 | Smith | ..................... | H04L 67/02 709/203 |
| 2015/0135258 A1* | 5/2015 | Smith | ..................... | G06F 21/45 726/1 |
| 2015/0141055 A1* | 5/2015 | Barrand | ................ | H04W 64/00 455/456.3 |
| 2015/0282049 A1* | 10/2015 | Zhan | ..................... | H04W 48/08 455/414.1 |
| 2015/0304389 A1* | 10/2015 | Chiussi | .................. | H04W 4/12 709/203 |
| 2016/0044497 A1* | 2/2016 | Soini | ...................... | H04W 8/22 455/419 |
| 2017/0090903 A1* | 3/2017 | Bainville | .................. | G06F 8/71 |
| 2017/0163631 A1* | 6/2017 | Brucker | ............. | H04L 63/0823 |
| 2017/0223055 A1 | 8/2017 | Russo et al. | | |

OTHER PUBLICATIONS

Final Office Action, dated Dec. 14, 2017, regarding U.S. Appl. No. 15/009,423, 33 pages.

Notice of Allowance, dated Aug. 9, 2018, regarding U.S. Appl. No. 15/009,423, 18 pages.

* cited by examiner

DYNAMIC APPLICATION VERSIONING SYSTEM

CROSS-REFERENCE TO RELATED APPLICATION

This application is a continuation of patent application U.S. Ser. No. 15/009,423, filed Jan. 28, 2016, entitled "Dynamic Application Versioning System," status Allowed, which is incorporated herein by reference in its entirety.

BACKGROUND INFORMATION

1. Field:

The present disclosure relates generally to an improved computer system and, in particular, to a method and apparatus for accessing application services in a computer system. Still more particularly, the present disclosure relates to a method and apparatus for controlling access to applications versions for providing services in a computer system.

2. Background:

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

Organizations may use information systems to enable services that allow people to access information within these databases regarding the records, activities, information, and operations of the organization. These information systems can grant access to the information databases by authenticating the user.

Information about the employees may be searched and viewed to perform various operations within an organization. Searching information systems may return large amounts of information. However, organizations may not wish to provide access to all information within the database. Organizations often provide different services, each service providing access to different portions of the information.

Additionally, some portions of the information are not suitable for some users. The organization may wish to prevent dissemination of portions of the information based on Privacy concerns, geographical restrictions, and other relevant considerations. Thus, providing services that allow or prevent access to portions of the information within a database may be more cumbersome and time-consuming than desired.

Therefore, it would be desirable to have a method and apparatus that take into account at least some of the issues discussed above, as well as other possible issues. For example, it would be desirable to have a method and apparatus that overcome a technical problem of having different obligated services that makes providing services to different people more cumbersome and time-consuming than desired.

SUMMARY

An embodiment of the present disclosure provides a method for controlling the presentation of a mobile application on a mobile device. A computer system authenticates a user of a mobile application. In response to authenticating the user, the computer system identifies a user profile for the user. The user profile includes a current application state for the mobile application. The computer system then selects an application version based on applying a set of rules to the current application state. The computer system then sends a response to the mobile device indicating the selected application version, enabling performing an operation for the organization based on the selected version for the mobile application selectively enabling access to services provided by the organization for people.

Another embodiment of the present disclosure provides a computer system comprising an application manager executing on an application server. An application manager authenticates a user of a mobile application. In response to authenticating the user, the application manager identifies a user profile for the user. The user profile includes a current application state for the mobile application. The application manager then selects an application version based on applying a set of rules to the current application state. The application manager then sends a response to the mobile device indicating the selected application version, enabling performing an operation for the organization based on the selected version for the mobile application selectively enabling access to services provided by the organization for people.

Yet another embodiment of the present disclosure provides computer program product for controlling the presentation of a mobile application on a mobile device comprising a computer readable storage media, and first program code, second program code, third program code, and fourth program code stored on the computer readable storage media. The first program code authenticates a user of a mobile application. In response to authenticating the user, the second program code identifies a user profile for the user. The user profile includes a current application state for the mobile application. The third program code selects an application version based on applying a set of rules to the current application state. The fourth program code sends a response to the mobile device indicating the selected application version, enabling performing an operation for the organization based on the selected version for the mobile application selectively enabling access to services provided by the organization for people.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that an organization may need to provide people with access to obligated services during performance of certain operations for the organization. The illustrative embodiments also recognize and take into account that having different obligated services makes providing services to different people more cumbersome and time-consuming than desired. In some cases, when a newer version of a mobile application is available, different groups of users may need to migrate to the newer version on a different schedule based on availability of features. As a group of users becomes eligible to use the newer version, the user profile for these users will be updated to allow them to access the newer version.

The user profile driven dynamic application versioning system is designed to facilitate gradual and flexible migration of users from relying on one binary to relying on another binary. Although switching users from relying on one binary to another binary is not unusual in a desktop environment, it is traditionally not done in a mobile environment, particularly with Apple's iOS environment.

The user profile driven dynamic application versioning system relies on a dual binary architecture. Under the dual binary architecture, two distinct binary files (or application executables) share an application icon behind the scene on a mobile device. Information on the binary file can trigger a user profile change as to dynamically drive a user to access one binary file and not the other.

The user profile driven dynamic application versioning system has many advantages. When an application has millions of users relying on different features of the application, waiting for all features to be updated before completely replacing the older version with a new version may cause significant delay. On the other hand, a gradual approach to switch segments of the users to the newer version as relevant features become available and having the built in flexibility of switching users back will work much better for application owners and users alike.

Figure 1:
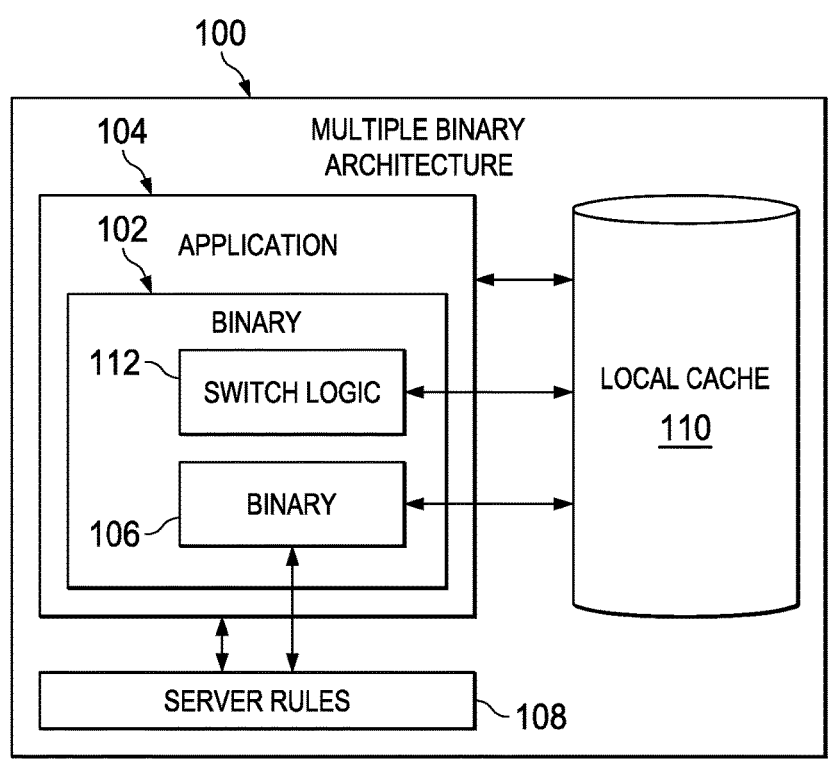
FIG. 1 is an illustration of a block diagram of a multiple binary architecture for implementing application versions in accordance with an illustrative embodiment.

With reference now to the figures and, in particular, reference to FIG. 1, an illustration of a block diagram of a multiple binary architecture for implementing application versions is depicted in accordance with an illustrative embodiment. In this illustrative example, multiple binary architecture 100 includes binary 102. Binary 102 is a compiled software program that can be executed by a computer processor to provide services of application 104.

Binary 102 includes binary 106. Binary 106 is a compiled software program contained within binary 102 that can be executed by a computer processor to provide services of application 104. Because binary 106 is contained within binary 102, both binary 102 and binary 106 are delivered to consumer as a single application 104. In an illustrative embodiment, binary 102 and binary 106 are different versions of application 104.

As depicted, binary 102 includes a single embedded binary 106. However, such a depiction is for illustrative purposes only. It should be recognized that binary 102 can include additional binaries to implement additional versions of application 104.

In an illustrative embodiment, both binary 102 and binary 106 contain separate resources that are used to execute application 104. Resources contained within and utilized by binary 102, such as but not limited to, libraries, files, strings, and reference documentation in providing application 104 are not shared with binary 106. Likewise, resources contained within and utilized by binary 106 in providing application 104 are not shared with binary 102.

Execution of either binary 102 or binary 106 is controlled by server rules 108 and user preferences stored in local cache 110. Server rules 108 enables selective control over execution of either binary 102 or binary 106 by an application service provider. Local cache 110 can be local storage within a mobile device, and stores user preferences for application 104. User preferences stored within local cache 110 enables selective control over execution of either binary 102 or binary 106 by an end user.

As depicted, application 104 includes switch logic 112 within binary 102. Switch logic 112 selectively controls the execution of either binary 102 or binary 106 based on application of server rules 108 and user preferences stored within local cache 110. Upon execution of application 104, switch logic 112 identifies server rules 108 and user preferences within local cache 110 and selectively executes one of binary 102 or binary 106 to provide services of application 104.

Figure 2:
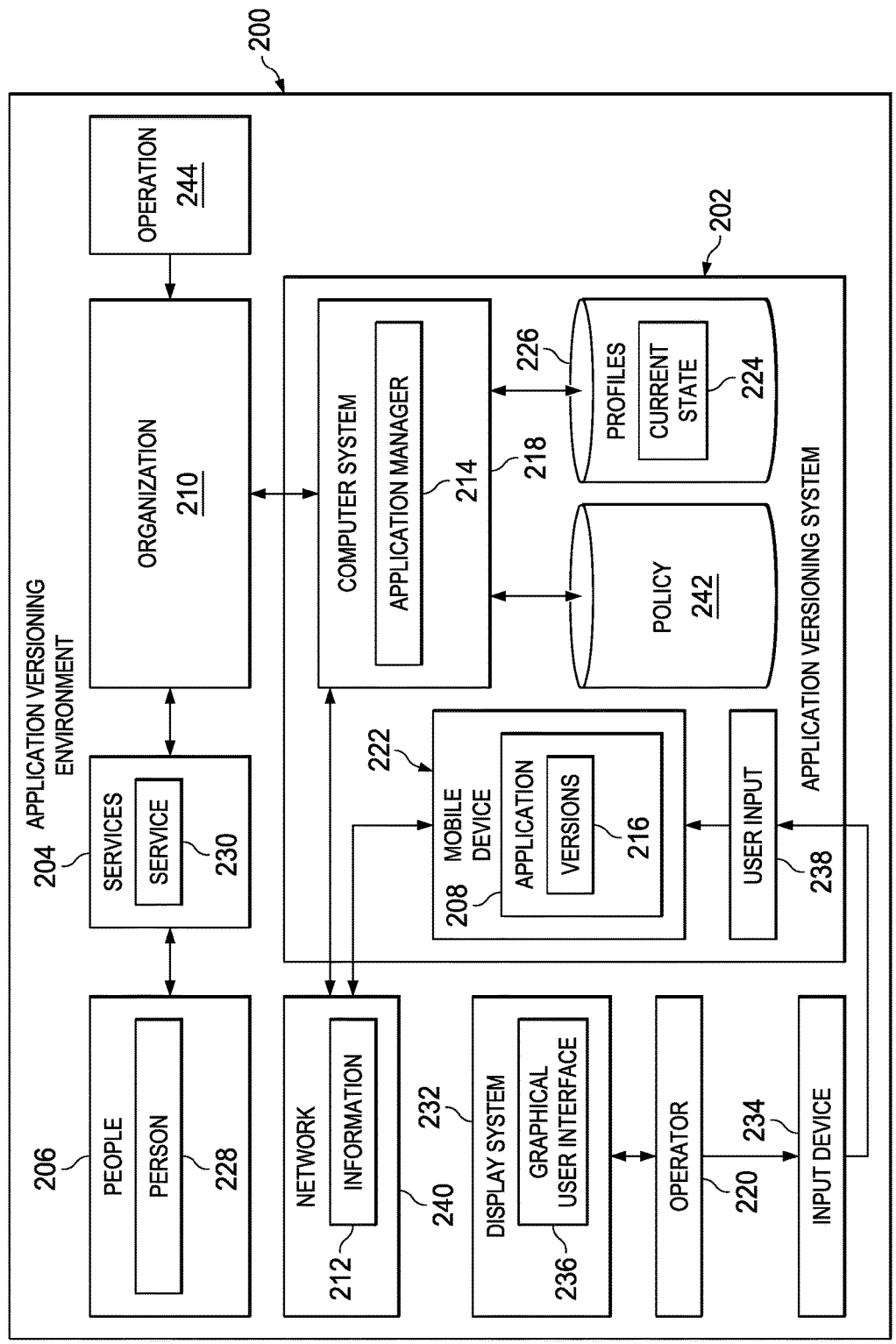
FIG. 2 is an illustration of a block diagram of an application versioning environment in accordance with an illustrative embodiment.

Referring now to FIG. 2, an illustration of a block diagram of an application versioning environment is depicted in accordance with an illustrative embodiment. In this illustrative example, application versioning environment 200 includes application versioning system 202. Application versioning system 202 provides services 204 for people 206 through application 208. Application 208 is an example of application 104 is shown in block form in FIG. 1.

Services 204 may be services provided by organization 210 that allow people 206 to access information 212. The access of information 212 may be at least one of reading, writing, modifying, storing, or deleting information 212.

Information 212 may be information for at least one of people, products, services, business plans, performance reviews, payroll, human resources, benefits administration, business plans, marketing, research, product development, or other suitable information. As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, organization 210 may be, for example, a corporation, a partnership, a charitable organization, a city, a government agency, or some other suitable type of organization. People 206 may be employees of organization 210. In other illustrative examples, people 206 may be members of organization 210 without being employees. In other illustrative examples, people 206 may be beneficiaries of services 204, without being employees. For example, organization 210 may provide services 204 for an employer of people 206.

Application versioning system 202 provides services 204 to access information 212 through application 208. For example, application versioning system 202 may be used for at least one of payroll services, benefits administration services, product development services, marketing services, or other suitable services 204 provided by organization 210 for people 206.

Is in one illustrative example, application manager 214 may be used to control access to services 204 by people 206 through selectively enabling one of versions 216 of application 208.

As depicted, application manager 214 may be implemented in software, hardware, firmware or a combination thereof. When software is used, the operations performed by application manager 214 may be implemented in program code configured to run on hardware, such as a processor unit. When firmware is used, the operations performed by application manager 214 may be implemented in program code and data and stored in persistent memory to run on a processor unit. When hardware is employed, the hardware may include circuits that operate to perform the operations in application manager 214.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, application manager 214 may be implemented in computer system 218. A computer system 218 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system. In an illustrative example, computer system 218 is an application server that provides services 204 to operator 220 through application 208 running on mobile device 222.

In the illustrative example, application manager 214 controls presentation of application 208 on mobile device 222. By controlling presentation of application 208, application manager 214 controls access to services 204. In the illustrative example, application manager 214 controls presentation of application 208 by causing mobile device 222 to implement one of versions 216 of application 208. In an illustrative example, each of versions 216 is one of binary 102 or binary 106, depicted in block form in FIG. 1.

Each of versions 216 is a particular form or type of application 208. In an illustrative embodiment, each of versions 216 contains separate resources that are used to execute application 208. Resources contained within and utilized by a particular one of versions 216, such as but not limited to, libraries, files, strings, and reference documentation in providing application 208 are not shared with others of versions 216.

In the illustrative example, each of versions 216 comprises a number of bytes within application 208. Updates to application 208 adding additional versions 216 does not change the number of bytes within previous versions. In the illustrative example, application manager 214 controls presentation of different ones of versions 216 of application 208 by at least one of identifying and modifying current state 224 of application 208.

Current state 224 is information identifying which of versions 216 to implement for people 206. Current state 224 is associated with profiles of people 206, stored on a database of profiles 226. As depicted, current state 224 is associated with a profile for person 228. As in an illustrative example, current state 224 is determined based on server rules 108 and user preferences stored in local cache 110, both depicted in block form in FIG. 1.

In an illustrative example, different ones of versions 216 may provide access to different ones of services 204. Different ones of services 204 may provide access to different portions of information 212. For example, a first one of versions 216 may provide access to service 230, while excluding others of services 204. In this example, the first one of versions 216 may be indicated by a first state for current state 224. In another example, a second one of versions 216 may exclude access to service 230 while providing access to others of services 204. This second one of versions 216 may be indicated by a second state for current state 224.

Operator 220 may interact with application 208 to access services 204 provided by organization 210. Application manager 214 controls presentation of versions 216 of application 208. In this manner, application manager 214 controls access to services 204 by application 208. For example, application manager 214 may set current state 224 indicating a particular one of versions 216. In this example, application manager 214 may set current state 224 to indicate one of versions 216 that provides access to service 230, while excluding others of services 204. In this manner, application manager 214 selectively controls access to information 212 based on which of versions 216 is presented on mobile device 222 according to current state 224.

As depicted, operator 220 may interact with versions 216 of application 208 using display system 232 and input device 234. Graphical user interface 236 is displayed on display system 232 and provides visualization of information 212 and interaction with services 204 through application 208.

As depicted, display system 232 is a hardware system and includes one or more display devices on which graphical user interface 236 may be displayed. The display devices may include at least one of a light emitting diode display (LED), a liquid crystal display (LCD), an organic light emitting diode display (OLED), or some other suitable device on which graphical user interface 236 can be displayed. Operator 220 may interact with graphical user interface 236 through user input 238 generated by input device 234. Input device 234 may be, for example, a mouse, a keyboard, a trackball, a touchscreen, a stylus, or some other suitable type of input device.

In operation, application manager 214 in computer system 218 provide a method for enabling different ones of services 204 provided by organization 210 to different ones of people 206. Application manager 214 controls presentation of versions 216 of application 208, thereby enabling access to different ones of services 204. Through different services 204, application 208 accesses different portions of information 212 within network 240. Network 240 is located in at least one of application versioning system 202 or outside of application versioning system 202. For example, network 240 may include at least one of a local area network (LAN), a wide area network (WAN), the Internet, an intranet, or some other suitable type of network.

Application manager 214 selectively provides access to information 212 found in network 240 by at least one of identifying and modifying current state 224 for application 208. Additionally, application manager 214 identifies and modifies current state 224 for application 208 according to policy 242 for presenting versions 216 of application 208. By presenting versions 216 of application 208, versions 216 may be relied upon to perform an operation 244 for organization 210 in this illustrative example.

In this illustrative example, policy 242 is a group of rules. Policy 242 also may include data used to apply the group of rules. As used herein, the "group of," when used with reference to items, means one or more items. For example, a "group of rules" is one or more rules. In this illustrative example, policy 242 is a group of rules that allows organization 210 to control switching between versions 216 of application 208. In this illustrative example, policy 242 is an example of server rules 108, depicted in block form in FIG. 1.

As depicted, application manager 214 enables presentation of versions 216 of application 208 by identifying current state 224 associated with person 228. By selectively presenting versions 216, application manager 214 enables selective presentation of services 204 to people 206.

As a result, more certainty is present in performing operation 244 based on presenting versions 216 of application 208 to people 206 when using application manager 214. In other words, identifying and modifying current state 224 enables access to different versions 216 of application 208, the different versions enabling different services 204. In an illustrative example, when organization 210 is obligated to provide service 230 to person 228, one or more rules in policy 242 may require or prevent some application states. Application manager 214 identifies are modifies current state 224 based on application of the one or more rules in policy 242. In this manner, performing operation 244 for organization 210 is enabled based on current state 224 corresponding to different versions 216 of application 208.

The illustrative example in FIG. 2 and the examples in other subsequent figures provide one or more technical solutions to overcome the technical problem of having different obligated services that makes providing services to different people more cumbersome and time-consuming than desired. For example, application manager 214 identifies current state 224 for application 208 from a profiles 226 for person 228. As another example, application manager 214 selects one versions 216 of application 208 based on an application of a set of rules in policy 242 to current state 224. As another example, application manager 214 informs mobile device 222 of the identification of which of versions 216 of application 208 is to be presented on mobile device 222 based on application of policy 242 to current state 224.

In this manner, the use of application manager 214 has a technical effect of reducing time, effort, or both in providing services 204 to people 206. In this manner, operations performed for organization 210 may be performed more efficiently as compared to currently used systems for providing services 204 to people 206. For example, versions 216 indicated by current state 224 may be used to provide services 204 two people 206 during operation 244. Services 204 can be selected from at least one of hiring services, benefits administration services, payroll services, performance review services, forming teams for new products, assigning research projects, directory services or other suitable services 204 provided by organization 210 for people 206. Operation 244 can be selected from at least one of launching application 208, slow roll-out of application 208, implementing new versions 216 for application 208, and other suitable operations 244.

As a result, computer system 218 operates as a special purpose computer system in which application manager 214 in computer system 218 enables will presenting different versions 216 of application 208 on mobile device 222. For example, application manager 214 enables different services 204 for different people 206 by setting current state 224 according to policy 242. In other words, identifying and modifying current state 224 enables access to different versions 216 of application 208, the different versions enabling different services 204. In an illustrative example, when organization 210 is obligated to provide service 230 to person 228, one or more rules in policy 242 may require or prevent some application states. Application manager 214 identifies are modifies current state 224 based on application of the one or more rules in policy 242.

Thus, application manager 214 transforms computer system 218 into a special purpose computer system as compared to currently available general computer systems that do not have application manager 214. Currently used general computer systems do not reduce the time or effort needed to provide services 204 to people 206. Further, currently used general computer systems do not provide for selecting one of versions 216 of application 208 based on an application of policy 242 to current state 224.

Figure 3:
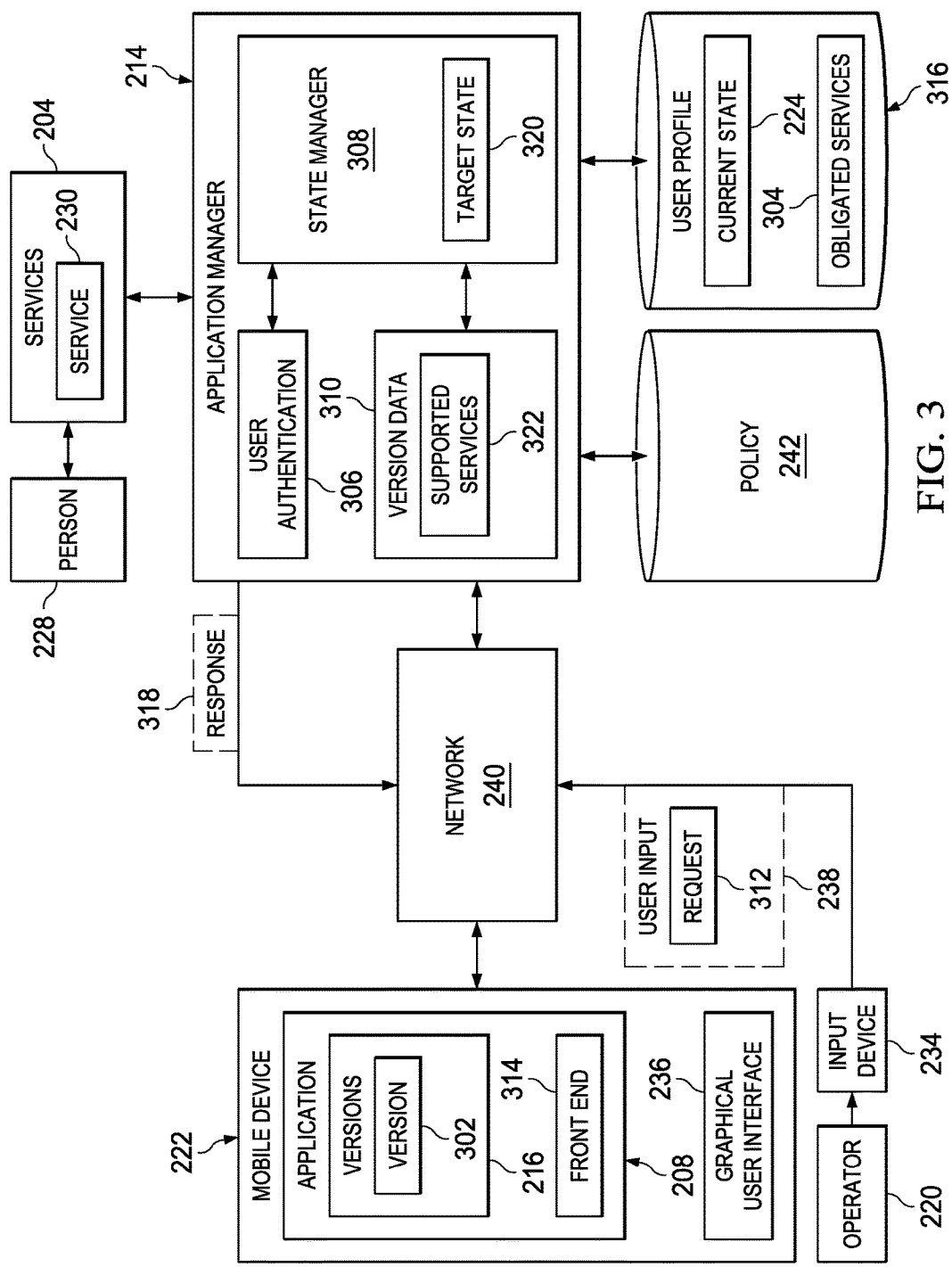
FIG. 3 is an illustration of a block diagram of data flow for identifying a version of an application based on services obligated by an organization to a person in accordance with an illustrative embodiment.

With reference next to FIG. 3, an illustration of a block diagram of data flow for identifying a version of an application based on services obligated by organization to a person is depicted in accordance with an illustrative embodiment. In this figure, an example of a data flow for identifying and presenting version 302 of application 208 that enables obligated services 204 and meets policy 242 through application manager 214 is shown. In the illustrative examples, the same reference numeral may be used in more than one figure. This reuse of a reference numeral in different figures represents the same element in the different figures.

As depicted, application manager 214 has a number of different components. As used herein, a "number of items" means one or more items. For example, "a number of different components" means one or more components. As depicted, application manager 214 includes user authentication 306, state manager 308, and version data 310.

User authentication 306 authenticates operator 220 as person 228. User authentication 306 authenticates operator 220 by receiving request 312. Request 312 is requested for authentication, and can include any personally identifying information for person 228. In an illustrative example, request 312 can include a username and a password for person 228.

As depicted, graphical user interface 236 displays front end 314 for application 208. Front end 314 provides graphical user elements through which operator 220 can be authenticated as person 228. In an illustrative example, front end 314 comprises a login screen and a switching logic for application 208. In the illustrative example, front end 314 can be implemented in switch logic 112, depicted in block form in FIG. 1. Operator 220 can submit request 312 through user input 238 entered into front end 314 displayed on graphical user interface 236.

State manager 308 applies group of rules in policy 242 to user profile 316 to identify current state 224. State manager 308 identifies current state 224 corresponding to version 302 based on the results of applying the group of rules to user profile 316.

For example, one rule in policy 242 may identify current state 224 from user profile 316 of person 228. User profile 316 is one of profiles 226, shown in block form in FIG. 2, that corresponds to person 228. Identifying current state 224 may be made by locating user profile 316 based on authentication information received in the request 312, and identifying current state 224 associated with user profile 316. In the present example, the rule in policy 242 correlates current state 224 to version 302 of application 208.

In response to identifying current state 224 from user profile 316 based on policy 242, application manager 214 sends response 318 to mobile device 222. Response 318 includes information indicating version 302 as being identified by application manager 214 based on policy 242. Based on response 318, mobile device 222 presents version 302 of application 208.

State manager 308 applies group of rules in policy 242 to user profile 316 to identify target state 320. Target state 320 is an application state for application 208 identified from the application of policy 242 to user profile 316.

For example, one rule in policy 242 may identify target state 320 based on obligated services 304. Obligated services 304 are a subset of services 204 which organization 210, shown in block diagram in FIG. 2, provides to person 228. As depicted, obligated services 304 includes service 230.

In this example, state manager 308 determines which of versions 216 support obligated services 304. This determination may be made by determining whether supported services 322 in version data 310 includes an indication of service 230. In this example, version data 310 is data describing version 302 of application 208. Supported services 322 is a subset of services 204 supported by version 302. Supported services 322 include service 230.

In response to determining that supported services 322 includes all of obligated services 304, state manager 308 applies group of rules in policy 242 to user profile 316 to update current state 224. In this illustrative example, state manager 308 updates current state 224 by setting current state 224 equal to target state 320 in response to determining that supported services 322 includes service 230.

For example, one rule in policy 242 may update current state 224 based on target state 320. State manager 308 may update target state 320 by first determining a discrepancy between target state 320 and current state 224. Alternatively, state manager 308 may simply set current state 224 equal to target state 320 in response to authenticating operator 220 as person 228.

In an illustrative example, state manager 308 updates current state 224 after sending response 318 to mobile device 222. In this example, a mobile device 222 selects one of previous versions 216 based on previous values for current state 224. Version 302 of application 208 is then accessed on a subsequent request 312 from mobile device 222 by operator 220.

Figure 4:
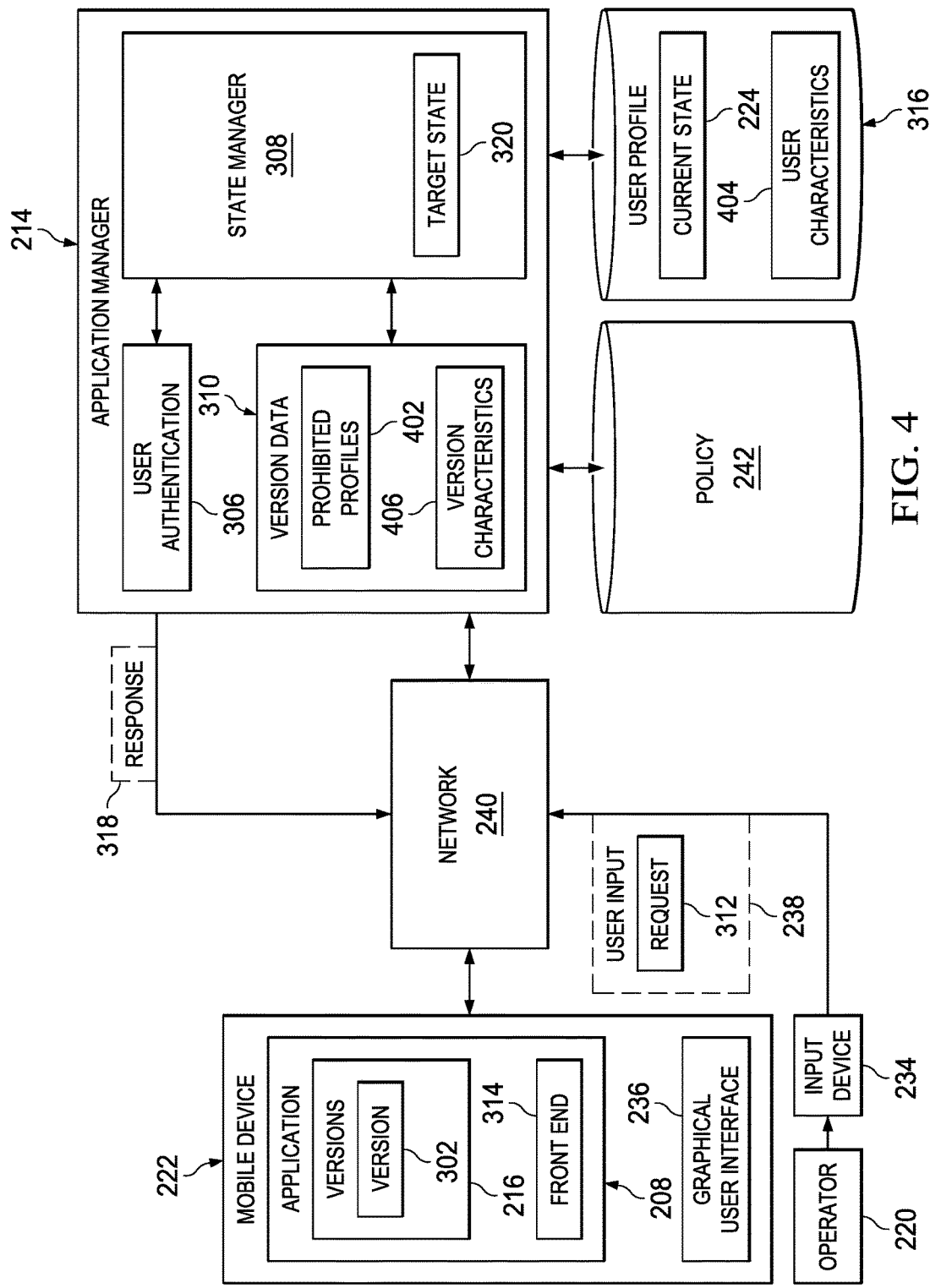
FIG. 4 is an illustration of a block diagram of data flow for identifying a version of an application based on prohibited profiles in accordance with an illustrative embodiment.

With reference next to FIG. 4, an illustration of a block diagram of data flow for identifying a version of an application based on prohibited profiles is depicted in accordance with an illustrative embodiment. In this figure, an example of a data flow for identifying and presenting version 302 of application 208 through application manager 214, based on user profile 316 meeting policy 242 is shown.

State manager 308 applies group of rules in policy 242 to user profile 316 to identify target state 320. Target state 320 is an application state for application 208 identified from the application of policy 242 to user profile 316.

For example, one rule in policy 242 may update current state 224 based on prohibited profiles 402 for target state 320. Prohibited profiles 402 are a subset of profiles 226, shown in block form in FIG. 2, that are prohibited from accessing a particular one of versions 216 of application 208. In this illustrative example, prohibited profiles 402 are user profiles prohibited from accessing version 302 of application 208.

In an illustrative example, state manager 308 determines whether user profile 316 is one of prohibited profiles 402 based on user characteristics 404. In this example, user characteristics 404 are information about person 228 is used to either permit or deny access to versions 216 of application 208. User characteristics 404 can include information, such as but not limited to, at least one of a nationality of person 228, a geographic region in which person 228 is located, an employer of person 228, and other suitable characteristics of person 228. In this illustrative example, state manager 308 updates current state 224 by setting current state 224 equal to target state 320 in response to determining that user profile 316 is not one of prohibited profiles 402 based on user characteristics 404.

In another illustrative example, state manager 308 determines whether user profile 316 is one of prohibited profiles 402 based on version characteristics 406. Version characteristics 406 are information about versions 216 used to either permit or deny access to versions 216 application 208. Version characteristics 406 can include information, such as but not limited to, a limit on a number of profiles 226 that can be associated with a particular one of versions 216, a number of profiles 226 currently associated with a particular one of versions 216, and other suitable characteristics of versions 216. In this example, version characteristics 406 are characteristics about version 302. State manager 308 updates current state 224 by setting current state 224 equal to target state 320 in response to determining that user profile 316 is not one of prohibited profiles 402 based on version characteristics 406.

Figure 5:
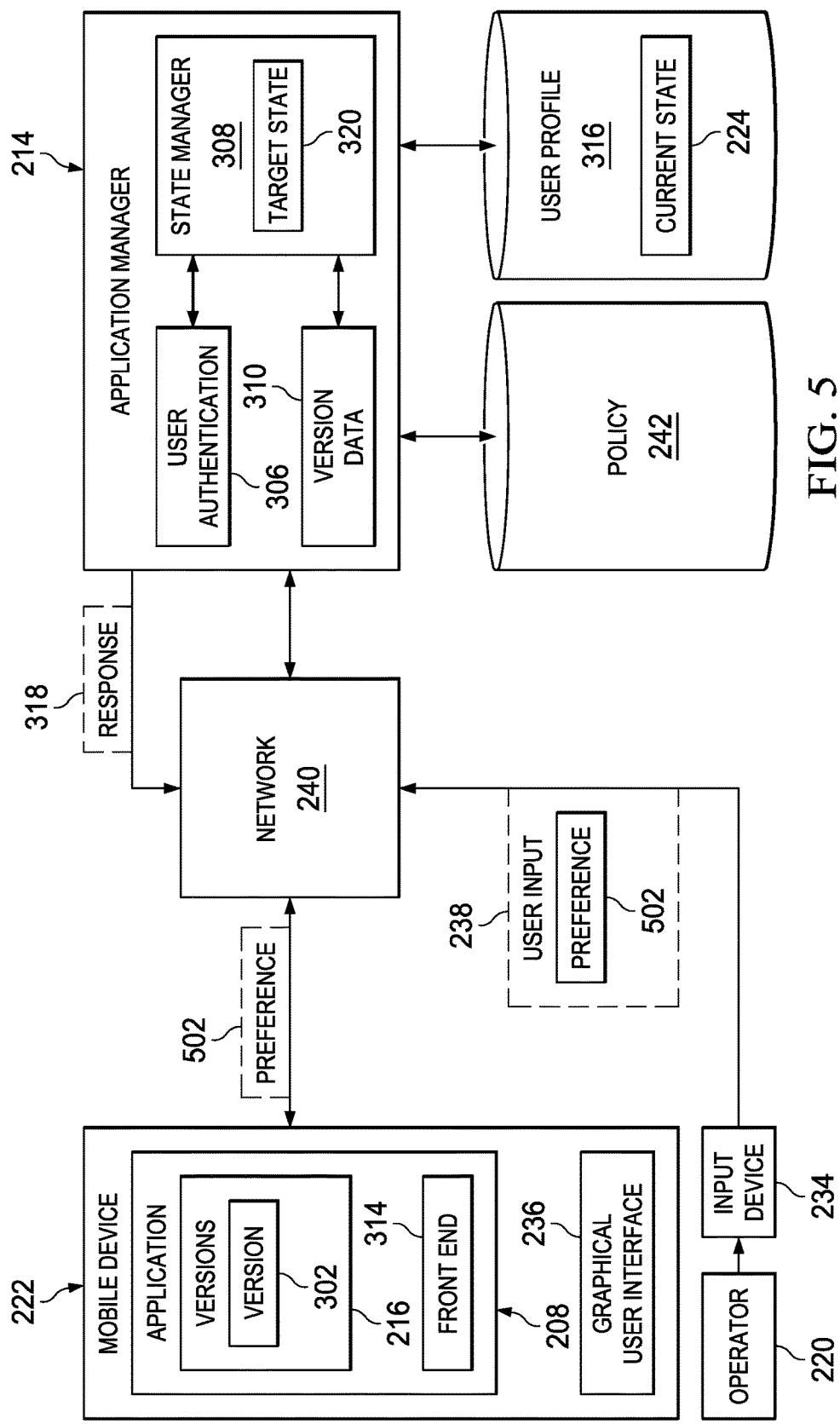
FIG. 5 is an illustration of a block diagram of data flow for identifying a version of an application based on user preferences in accordance with an illustrative embodiment.

With reference next to FIG. 5, an illustration of a block diagram of data flow for identifying a version of an application based on user preferences is depicted in accordance with an illustrative embodiment. In this figure, an example of a data flow for identifying and presenting version 302 of application 208 through application manager 214, based on user preference 502 meeting policy 242 is shown.

State manager 308 applies group of rules in policy 242 to user profile 316 to identify target state 320. Target state 320 is an application state for application 208 identified from the application of policy 242 to preference 502.

Preference 502 is a preference of person 228, shown in block form in FIG. 2, for a particular one of versions 216 of application 208. As depicted, preference 502 is stored with application 208 on mobile device 222.

For example, one rule in policy 242 may determine target state 320 from preference 502. In an illustrative example, the determination may be made by receiving preference 502 through user input 238. Alternatively, state manager 308 may passively determine preference 502 without operator 220 actively submitting user input 238. State manager 308 is passively determined preference 502 by receiving a push of preference 502 from application 208, or by pulling preference 502 from application 208.

For example, one rule in policy 242 may update current state 224 based on target state 320 determined from preference 502. State manager 308 updates current state 224 by setting current state 224 equal to target state 320.

In an illustrative example, state manager 308 updates current state 224 based on target state 320 determined from preference 502 only when preferences 502 to not violate another rule in policy 242. For example, if target state 320 determined from preference 502 indicates one of set of versions 216 that does not support obligated services 304, shown in block form in FIG. 3, state manager 308 does not update current state 224 based on target state 320 determined from preferences 502. In another example, if target state 320 determined from preference 502 indicates one of set of versions 216 for which user profile 316 is a prohibited profile 402, shown in block form in FIG. 4, state manager 308 does not update current state 224 based on target state determined from preferences 502.

Figure 6:
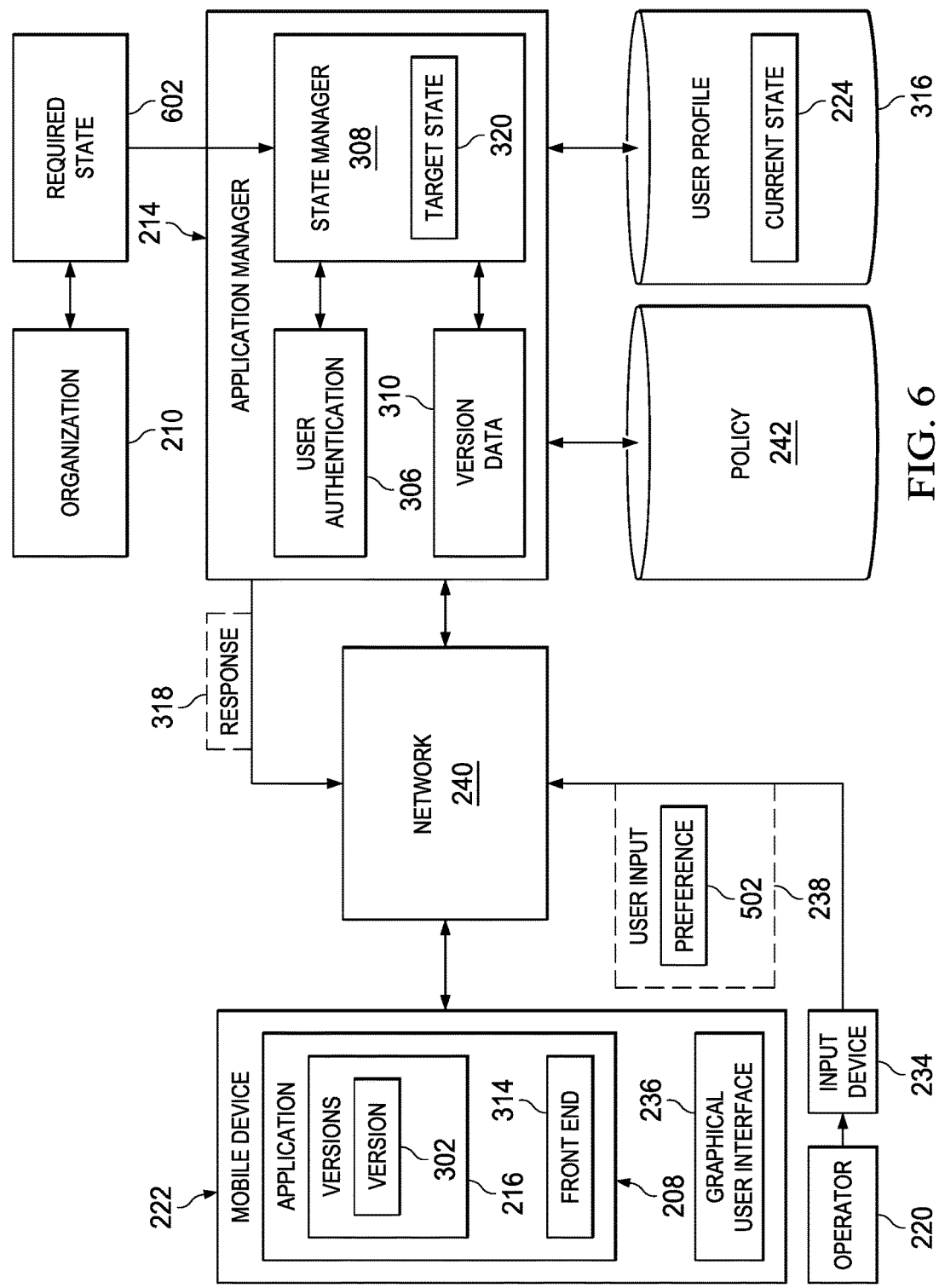
FIG. 6 is an illustration of a block diagram of data flow for identifying a version of an application based on a required application version in accordance with an illustrative embodiment.

With reference next to FIG. 6, an illustration of a block diagram of data flow for identifying a version of an application based on a required application version is depicted in accordance with an illustrative embodiment. In this figure, an example of a data flow for identifying and presenting version 302 of application 208 through application manager 214 based on required state 602 is shown.

State manager 308 applies group of rules in policy 242 to user profile 316 to identify target state 320. Target state 320 is an application state for application 208 identified on the application of policy 242 to required state 602.

Required state 602 is an application state for application 208 required by organization 210. As depicted, application manager 214 receives required state 602 from organization 210.

For example, one rule in policy 242 may determine target state 320 from required state 602. In an illustrative example, the determination may be made by receiving input from organization 210 specifying required state 602 for application 208. State manager 308 updates target state 320 by setting target state 320 equal to required state 602.

For example, one rule in policy 242 may update current state 224 based on target state 320 determined from required state 602. State manager 308 updates current state 224 by setting current state 224 equal to target state 320.

In an illustrative example, one rule in policy 242 may prevent further updates to target state 320 by state manager 308 when target state 320 is required state 602. In this example, application manager 214 prevents state manager 308 from making additional changes to target state 320 until further information is received from organization 210. The information can be information indicating that target state 320 is no longer required state 602.

Figure 7:
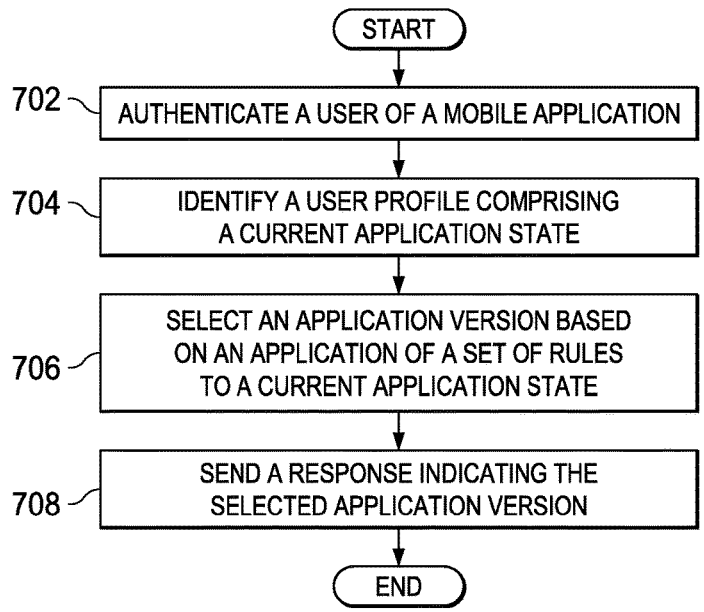
FIG. 7 is an illustration of a flowchart of a process for identifying an application version based on applying a set of rules to a current application state in accordance with an illustrative embodiment.

With reference now to FIG. 7, an illustration of a flowchart of a process for identifying an application version based on applying a set of rules to a current application state is depicted in accordance with an illustrative embodiment. The process illustrated in FIG. 7 may be implemented in application versioning environment 200, shown in block form in FIG. 2. This process may be used to enable operations for organization 210. In particular, the process may be implemented in application manager 214 in computer system 218.

The process begins by authenticating a user of a mobile application (step 702). In response to authenticating the user, the process identifies a user profile for the user (step 704). The user profile includes a current application state for the mobile application. The process then selects an application version based on applying a set of rules to the current application state for the mobile application (step 706). The process then sends a response to the mobile device, indicating the selected application version (step 708), with the process terminating thereafter. In this manner, performing operation 244 for organization 210, both shown in block form in FIG. 2, is enabled based on identifying a version of an application to be presented on a mobile device.

Figure 8:
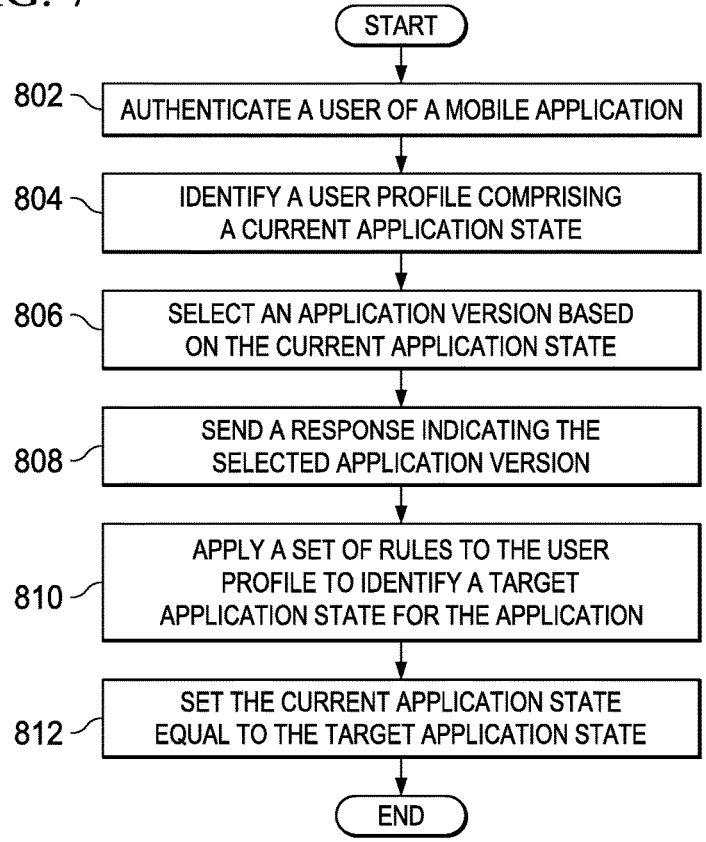
FIG. 8 is an illustration of a flowchart for updating an application state based on applying a set of rules to the current application state in accordance with an illustrative embodiment.

With reference now to FIG. 8, an illustration of a flowchart for updating an application state based on applying a set of rules to the current application state is depicted in accordance with an illustrative embodiment. The process illustrated in FIG. 8 may be implemented in application versioning environment 200, shown in block form in FIG. 2. This process may be used to enable operations for organization 210. In particular, the process may be implemented in application manager 214 in computer system 218.

The process begins by authenticating a user of a mobile application (step 802). In response to authenticating the user, the process identifies a user profile for the user (step 804). The user profile includes a current application state for the mobile application. The process then selects an application version based on the current application state (step 806). The process sends a response to the mobile device, indicating the selected application version (step 808). The process then applies a set of rules to the user profile to identify a target application state for the application (step 810). In response to identifying the target application state, the process sets the current application state equal to the target application state (step 812), with the process terminating thereafter. In this manner, performing operation 244 for organization 210, both shown in block form in FIG. 2, is enabled based on updating a version of an application to be presented on a mobile device.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
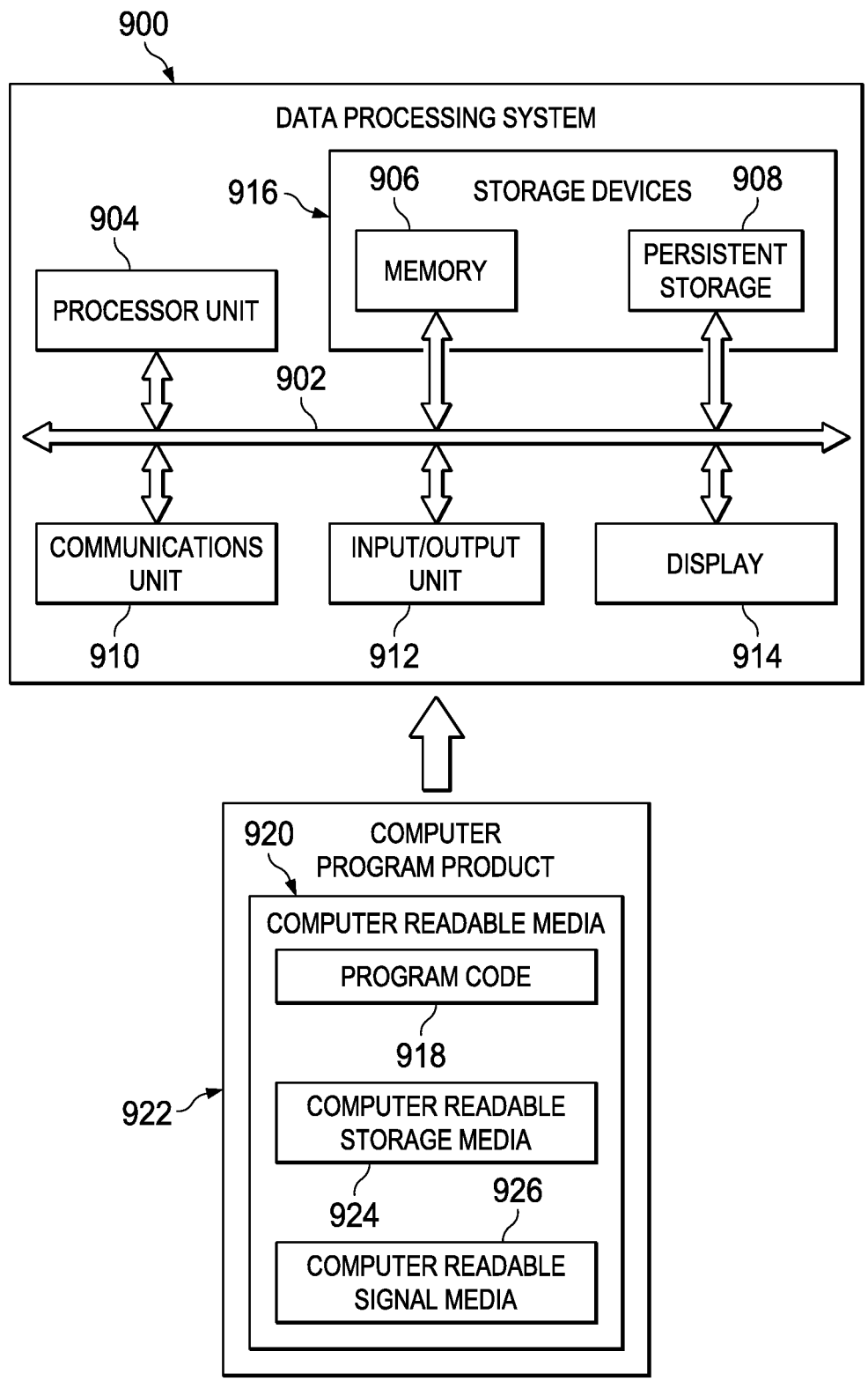
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement computer system 218 in FIG. 2. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918. Alternatively, program code 918 may be transferred to data processing system 900 using computer readable signal media 926. Computer readable signal media 926 may be, for example, a propagated data signal containing program code 918. For example, computer readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

Thus, the illustrative examples in the different figures provide one or more technical solutions to overcome a technical problem of having different obligated services that makes providing services to different people more cumbersome and time-consuming than desired. For example, application manager 214 identifies current state 224 for application 208 from a profiles 226 for person 228. As another example, application manager 214 selects one versions 216 of application 208 based on an application of a set of rules in policy 242 to current state 224. As another example, application manager 214 informs mobile device 222 of the identification of which of versions 216 of application 208 is to be presented on mobile device 222 based on application of policy 242 to current state 224. In this manner, the use of application manager 214 has a technical effect of reducing time, effort, or both in providing services 204 to people 206. In this manner, operations performed for organization 210 may be performed more efficiently as compared to currently used systems for providing services 204 to people 206. In this manner, the use of skill identifier 210 has a technical effect of reducing time, effort, or both in providing services for people as well as in performing operations for an organization.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling presentation of a mobile application on a mobile device, the method comprising: receiving, by an application server, a request from the mobile device to present the mobile application; identifying, by the application server, a user profile for a user of the mobile device, the user profile comprising a current application state of the mobile application; determining whether the user profile is one of a prohibited subset of profiles for a particular version of a set of application versions; selecting, by the application server, an application version for the mobile application from the set of application versions for the mobile application on the mobile device based on application of a set of rules to the current application state indicated in the user profile, wherein the set of rules comprises a rule for determining an eligibility of the user for one of the set of application versions, wherein the rule for determining the eligibility of the user prohibits the selected application version from being the particular version of the set of application versions; and sending, by the application server, a response to the mobile device, the response indicating to the mobile device to present the selected application version of the mobile application to the user.

2. The method of claim 1 further comprising: subsequent to sending the response to the mobile device, identifying a target application state of the mobile application based on the application of the set of rules to the current application state; and setting the current application state equal to the target application state.

3. The method of claim 1, wherein the set of rules further comprises: a rule for determining a preference of the user for one of the set of application versions, and a rule requiring one of the set of applications versions requirement by an application manager.

4. The method of claim 1, wherein the mobile application further comprises a number of services, wherein the user profile is associated with a subset of the number of services, wherein selecting an application version from a set of application versions based on an application of a set of rules to the current application state further comprises: determining the subset of the number of services associated with the user profile; and determining which of the set of application versions supports the subset of the number of services; wherein the rule for determining the eligibility of the user for one of the set of application versions requires the selected application version to support the subset of the number of services.

5. The method of claim 1, wherein the mobile application on the mobile device comprises: all of the set of application versions for the mobile application, wherein the set of application versions is a plurality of application versions for the mobile application.

6. The method of claim 5, wherein each of the set of application versions is a first set and comprises a number of bytes within the mobile application, the method further comprising: receiving an update to the first set of applications versions for the mobile application on the mobile device, wherein the update includes a new version of the mobile application and forms a second set of application versions.

7. The method of claim 6, wherein the update does not change the number of bytes within the mobile application for the first set of application versions of the mobile application.

8. A computer system comprising: a hardware processor; an application manager, in communication with the hardware processor and executing on an application server, wherein the application manager: receives a request from a mobile device to present a mobile application; identifies a user profile for a user of the mobile device, the user profile comprising a current application state of the mobile application; determines the user profile is one of a prohibited subset of profiles for a particular version of a set of application versions; selects an application version for the mobile application from the set of application versions for the mobile application on the mobile device based on application of a set of rules to the current application state indicated in the user profile, wherein the set of rules comprises a rule for determining an eligibility of the user for one of the set of application versions, wherein the rule for determining the eligibility of the user prohibits the selected application version from being the particular version of the set of application versions; and sends a response to the mobile device, the response indicating to the mobile device to present the selected application version of the mobile application to the user.

9. The computer system of claim 8, wherein the application manager: identifies a target application state of the mobile application subsequent to sending the response to the mobile device, wherein the target application state is based on the application of the set of rules to the current application state; and sets the current application state equal to the target application state.

10. The computer system of claim 8, wherein the set of rules further comprises a rule for determining a preference of the user for one of the set of application versions, and a rule requiring one of the set of applications versions requirement by the application manager.

11. The computer system of claim 8, wherein the mobile application further comprises a number of services and the user profile is associated with a subset of the number of services; and
wherein in selecting an application version from a set of application versions based on an application of a set of rules to the current application, the application manager:
determines the subset of the number of services associated with the user profile; and
determines which of the set of application versions supports the subset of the number of services; wherein
the rule for determining the eligibility of the user for one of the set of application versions requires the selected application version to support the subset of the number of services.

12. The computer system of claim 8, wherein the mobile application on the mobile device comprises:
all of the set of application versions for the mobile application, wherein the set of application versions is a plurality of application versions for the mobile application.

13. The computer system of claim 12, wherein each of the set of application versions is a first set and comprises a number of bytes within the mobile application, and wherein the application manager:
receives an update to the first set of applications versions for the mobile application on the mobile device, wherein the update includes a new version of the mobile application and forms a second set of application versions.

14. The computer system of claim 13, wherein the update does not change the number of bytes within the mobile application for the first set of application versions of the mobile application.

15. A computer program product for controlling presentation of a mobile application on a mobile device, the computer program product comprising: a non-transitory computer readable storage media; program code, stored on the non-transitory computer readable storage media, for receiving a request from the mobile device to present the mobile application; program code, stored on the non-transitory computer readable storage media, for identifying a user profile for a user of the mobile device, the user profile comprising a current application state of the mobile application; program code, stored on the non-transitory computer readable storage media, for determining whether the user profile is one of a prohibited subset of profiles for a particular version of a set of application versions; program code, stored on the non-transitory computer readable storage media, for selecting an application version for the mobile application from the set of application versions for the mobile application on the mobile device based on application of a set of rules to the current application state indicated in the user profile, wherein the set of rules comprises a rule for determining an eligibility of the user for one of the set of application versions, wherein the rule for determining the eligibility of the user prohibits the selected application version from being the particular version of the set of application versions; and program code, stored on the non-transitory computer readable storage media, for sending a response to the mobile device, the response indicating to the mobile device to present the selected application version of the mobile application to the user.

16. The computer program product of claim 15, further comprising:
program code, stored on the non-transitory computer readable storage media, for identifying a target application state of the mobile application based on the application of the set of rules to the current application state, wherein the fifth program code is executed subsequent to the fourth program code; and
program code, stored on the non-transitory computer readable storage media, for setting the current application state equal to the target application state.

17. The computer program product of claim 15, wherein the set of rules further comprises:
rule for determining a preference of the user for one of the set of application versions, and a rule requiring one of the set of applications versions requirement by an application manager.

18. The computer program product of claim 15, wherein the mobile application further comprises a number of services, wherein the user profile is associated with a subset of the number of services, wherein the program code further comprises:
program code for determining the subset of the number of services associated with the user profile; and
program code for determining which of the set of application versions supports the subset of the number of services; wherein
the rule for determining and the eligibility of the user for one of the set of application versions requires the selected application version to support the subset of the number of services.

19. The computer program product of claim 15, wherein the mobile application on the mobile device comprises all of the set of application versions for the mobile application, wherein the set of application versions is a plurality of application versions for the mobile application.

20. The computer program product of claim 19, wherein each of the set of application versions is a first set and comprises a number of bytes within the mobile application, the computer program product further comprising:
program code, stored on the non-transitory computer readable storage medium, for receiving an update to the first set of applications versions for the mobile application on the mobile device, wherein the update includes a new version of the mobile application and forms a second set of application versions.

21. The computer program product of claim 20, wherein the update does not change the number of bytes within the mobile application for the first set of application versions of the mobile application.

* * * * *